3,632,590
ESTERS DERIVED FROM 5-NITRO QUINALDINE
Eugene L. Leroi, Bievres, France, assignor to Societe d'Etudes de Produits Chimiques, Issy-les-Moulineaux, France
No Drawing. Filed July 22, 1968, Ser. No. 746,300
Claims priority, application Great Britain, Aug. 14, 1967, 37,267/67
Int. Cl. C07d 33/48
U.S. Cl. 260—287 R      1 Claim

ABSTRACT OF THE DISCLOSURE

Novel nitro quinaldine esters, having biological and therapeutic properties and low toxicity, having the general formula

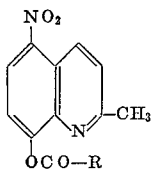

wherein R is a straight or branched chain, substituted or unsubstituted alkyl, or substituted or unsubstituted aryl, aralkyl or heterocyclic radical. They can be made by reacting 5-nitro quinaldine with an acid chloride.

---

This invention relates to novel esters derived from nitroquinaldine and methods of preparing them.

The esters of the invention may be represented by the general formula:

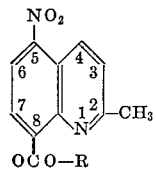

wherein R represents either an aliphatic alkyl radical, straight or branched, substituted or not, or a cyclic, aromatic aryl, arylalkyl, or heterocyclic radical, substituted or not.

The compounds of the invention have interesting biological and therapeutic properties and low toxicity. They are usable inter alia as bacteriostatics, bactericides, antifungics, amoebicides, trichomonacides, anthelminthics and insecticides.

The compounds of the invention may be prepared by reacting the appropriate acid chloride in slight excess with the nitroquinaldine.

A few examples of the preparation of certain of the compounds are given below.

EXAMPLE 1

5-nitro 8-acetoxy quinaldine 204 g. of 5-nitro 8-hydroxy quinaldine are dissolved in 1.8 l. of pyridine. 84 g. of acetyl chloride are added with stirring. The solution is cooled at about 0° C. and then acetyl chloride is added dropwise, under agitation and with cooling. After cooling, the reaction mass is poured into 7.5 l. of water and stirred for thirty minutes. The product is drained off and washed with a 5% aqueous solution of sodium carbonate, then with water. After drying, the product is crystallized from ethyl acetate. There is obtained, with a yield of 71%, a crystalline product, poorly soluble in water and soluble in pyridine, acetone and chloroform.

The analysis shows its composition to correspond to the formula $C_{12}H_{10}O_4N_2$.

EXAMPLE 2

5-nitro 8-(p.nitrobenzoxy) quinaldine 204 g. of 5-nitro 8-hydroxy quinaldine are dissolved in 1.8 l. of pyridine. 195 g. of p.nitrobenzoyl chloride are added with stirring. The solution is warmed on a steaming bath for one hour. After cooling, the reaction mass is poured into 7.5 l. of water and stirred for thirty minutes. The product is drained off and washed with a 5% aqueous solution of sodium carbonate, then with water. After drying, the product is crystallized from ethyl acetate. There is obtained, with a yield of 70%, a crystalline powder, poorly soluble in water and soluble in pyridine and chloroform.

The analysis shows its composition to correspond to the formula $C_{17}H_{11}N_3O_6$.

EXAMPLE 3

5-nitro 8-(alpha-furoxy) quinaldine 204 g. of 5-nitro 8-hydroxy quinaldine are dissolved in 1.8 l. of pyridine. The solution is cooled to about 0° C. and 137 g. of alpha furoyl chloride are added, with a constant agitation to prevent the temperature, in the reaction mass, from rising above 5° C. Stirring is continued for one night. The reaction mass is poured into 7.5 l. of water and stirred for thirty minutes. The product is drained off and washed with a 5% aqueous sodium carbonate solution, then with water. After drying, the product is crystallized from ethyl acetate. There is obtained, with a yield of 82%, a crystalline product, poorly soluble in water and ethyl ether, soluble in pyridine, acetone and chloroform.

The analysis shows its composition to correspond to the formula $C_{15}H_{10}N_2O_5$.

EXAMPLE 4

5-nitro 8-(5'-bromofuroxy) quinaldine

Using the same method as in Example 3, 204 g. of 5-nitro 8-hydroxy quinaldine are treated by 219 g. of 5-bromofuroyl chloride. There is obtained, with a yield of 77%, the 5-nitro 8-(5'-bromofuroxy) quinaldine melting at 137° C. The analysis shows its composition to correspond with the formula $C_{15}H_9N_2O_5Br$.

EXAMPLE 5

5-nitro 8-(5'-chlorofuroxy) quinaldine

Using the same method as in Example 3, 204 g. of 5-nitro 8-hydroxy quinaldine are treated by 174 g. of 5-chlorofuroyl chloride. There is obtained, with a yield of 81%, the 5-nitro 8-(5'-chlorofuroxy) quinaldine. The analysis shows its composition to correspond with the formula $C_{15}H_9N_2O_5Cl$.

EXAMPLE 6

5-nitro 8-(5'-nitrofuroxy) quinaldine

Using the same method as in Example 3, 204 g. of 5-nitro 8-hydroxy quinaldine are treated by 186 g. of 5-nitrofuroyl chloride. There is obtained, with a yield of 76%, the 5-nitro 8-(5'-nitrofuroxy) quinaldine melting at 161° C. The analysis shows its composition to correspond with the formula $C_{15}H_9N_3O_7$.

Toxicity.—These compounds have generally a low toxicity. The most toxic is the compound of Example 6 with $LD_{50}$ per os of 3.25 g./kg. on mice and the least toxic the compound of Example 4; at 5 g./kg., there are no deaths after 8 days.

Bacteriostatic activity.—The bacteriostatic action has been determined by the technique of dilution in gelose broth on 11 strains of bacteria and results are given in the following table wherein the compounds are named by the number of the corresponding example. The bacteriostatic doses are in μg./ml.

| Bacteria | Example | | | |
|---|---|---|---|---|
| | 3 | 4 | 5 | 6 |
| Staphylococcus aureus Oxford | 30 | 25 | 25 | 12 |
| Staphylococcus aureus H.B | 40 | 17.5 | 25 | 11 |
| Micrococcus pyogenes UC 1125 | 30 | 17.5 | 11 | 11 |
| Streptococcus faecalis ATCC 9790 | 30 | 25 | 25 | 25 |
| Escherichia coli L. 416 | 25 | 25 | 25 | 45 |
| Escherichia coli No. 11 | 25 | 150 | 45 | 60 |
| Escherichia coli No. 21 | 45 | 450 | 45 | 70 |
| Klebsiella pneumoniae L. 444 | 25 | 17.5 | 20 | 11 |
| Proteus vulgaris X 19 | 400 | 400 | 250 | 250 |
| Aerobacter aerogenes | 300 | 250 | 70 | 70 |
| Pseudomonas aeruginosa L. 414 | 500 | 400 | 300 | 500 |

These compounds may enter any usual formula suitable for therapeutic use. As example of presentation may be cited the formula, for gelules:

|  | G. |
|---|---|
| The compound of Example 6 | 0.100 |
| Lactose | 0.050 | for one gelule.

The doses to be used are from 0.50 g. to 1 g./day.

For external use these compounds may enter into creams or the like at doses of about 0.01 to 5 g. per 100 g. of drug.

I claim:
1. 5-nitro-8-(5'-bromo-furoxy) quinaldine.

References Cited

UNITED STATES PATENTS

| 2,387,591 | 10/1945 | Kolb | 260—286 X |
| 3,100,175 | 8/1963 | Bourquin et al. | 260—287 X |
| 3,136,768 | 6/1964 | Griot et al. | 260—289 X |
| 3,297,525 | 1/1967 | Grier | 260—287 X |
| 3,298,911 | 1/1967 | Renz et al. | 260—287 X |
| 3,307,970 | 3/1967 | Grier | 260—287 X |
| 3,362,960 | 1/1968 | Hodel | 260—287 |

FOREIGN PATENTS

| 1,168,339 | 10/1969 | Great Britain | 260—287 |

OTHER REFERENCES

Desvignes et al. As Abstr. in Chem. Abstr. vol. 60, col. 14862 (1964).

Japan 22,742 abstracted in Chem. Abstr., vol. 64, col. 8156.

France 1,174,432, abstracted in Chem. Abstr., vol. 54, col. 19722 (1960).

DONALD G. DAUS, Primary Examiner

U.S. Cl. X.R.

260—287 OX, 289 R; 424—258